United States Patent
Simpson

(10) Patent No.: US 11,047,443 B2
(45) Date of Patent: Jun. 29, 2021

(54) CONTINUOUS FIBER BRAKE ROTOR PREFORM AND APPARATUSES AND METHODS FOR MANUFACTURING SAME

(71) Applicant: BAM Inc., Knoxville, TN (US)

(72) Inventor: Allen Simpson, Buchanan, MI (US)

(73) Assignee: BAM Inc., Knoxville, TN (US)

( * ) Notice: Subject to any disclaimer, the term of this patent is extended or adjusted under 35 U.S.C. 154(b) by 0 days.

(21) Appl. No.: 15/035,715

(22) PCT Filed: Nov. 12, 2014

(86) PCT No.: PCT/US2014/065300
§ 371 (c)(1),
(2) Date: May 10, 2016

(87) PCT Pub. No.: WO2015/084556
PCT Pub. Date: Jun. 11, 2015

(65) Prior Publication Data
US 2016/0265611 A1 Sep. 15, 2016

Related U.S. Application Data

(60) Provisional application No. 61/903,036, filed on Nov. 12, 2013.

(51) Int. Cl.
*F16D 69/02* (2006.01)
*D04H 3/10* (2012.01)
(Continued)

(52) U.S. Cl.
CPC ............... *F16D 69/02* (2013.01); *B62L 1/00* (2013.01); *D04H 1/46* (2013.01); *D04H 1/498* (2013.01);
(Continued)

(58) Field of Classification Search
CPC . Y10T 428/213; Y10T 428/218; F16D 69/00; F16D 69/023; F16D 2069/008
See application file for complete search history.

(56) References Cited

U.S. PATENT DOCUMENTS 3,639,197 A * 2/1972 Spain .................... F16D 69/023
156/169
5,242,745 A * 9/1993 Aucagne .................. D03D 3/08
139/11
(Continued)

*Primary Examiner* — Alexander S Thomas

(57) ABSTRACT

A continuous fiber brake rotor preform and apparatuses and methods for manufacturing the preform are disclosed herein. The preform comprises a plurality of continuous fiber streams or filaments forming a substantially helical structure having layers or flights compressed together in the preform's longitudinal direction. Each continuous fiber stream or filament may comprise the same or different types of fiber, extends substantially between longitudinally disposed preform ends, and resides laterally adjacent to another continuous fiber stream or filament within each layer or flight of the helical structure. The radial distance between each continuous fiber stream or filament and the preform's longitudinal axis varies with angular location about the longitudinal axis. The preform further comprises web or z-direction fiber interspersed within the helical structure with certain of the web or z-direction fibers and continuous fiber streams or filaments extending at least partially in the longitudinal direction between the preform's layers or flights.

10 Claims, 2 Drawing Sheets

(51) Int. Cl.
    *D04H 3/105*    (2012.01)
    *D04H 5/02*     (2012.01)
    *D04H 18/02*    (2012.01)
    *B62L 1/00*     (2006.01)
    *D04H 1/46*     (2012.01)
    *D04H 1/498*    (2012.01)
    *D04H 3/018*    (2012.01)

(52) U.S. Cl.
    CPC ............... *D04H 3/018* (2013.01); *D04H 3/10* (2013.01); *D04H 3/105* (2013.01); *D04H 5/02* (2013.01); *D04H 18/02* (2013.01); *F16D 2200/0069* (2013.01); *Y10T 428/213* (2015.01)

(56) References Cited

U.S. PATENT DOCUMENTS 6,009,605 A * 1/2000 Olry ................. B29B 11/16
                                              28/107
6,248,417 B1 * 6/2001 Ponsolle ............... B32B 5/26
                                              28/107
9,045,846 B2 * 6/2015 Lecostaouec ........... D03D 1/00

* cited by examiner

FIG. 4     FIG. 5     FIG. 6

CONTINUOUS FIBER BRAKE ROTOR PREFORM AND APPARATUSES AND METHODS FOR MANUFACTURING SAME

FIELD OF THE INVENTION

The present invention relates, generally, to the field of brake rotor preforms and to apparatuses and methods for manufacturing brake rotor preforms and similarly fabricated articles.

BACKGROUND OF THE INVENTION

Many high-performance brake rotors used in aircraft, automobiles, and other vehicles are manufactured from fibrous brake rotor preforms (also sometimes referred to herein as "preforms"). The preforms are typically formed using two methods. According to the first method, the preforms are made from layers of annular-shaped segments of woven and/or non-woven cloth having fibers extending in chordal, radial, or both directions, or having some other ordered structure. According to the second method, layers of woven or nonwoven cloth are combined to create an ordered structure with the in-plane fibers. In both methods, the layers are then needled together in the vertical direction with a needling machine in an attempt to form a unitary structure from the layers. After needling, the structure formed in the second method is cut into toroidal-shaped preforms, resulting in twenty percent (20%) to thirty percent (30%) of the cloth being wasted. Typically, the preforms of both methods are then carbonized by heating to a temperature of greater than 1,200 degrees Celsius in a non-reactive atmosphere. Subsequently, a carbon matrix is added to the preforms using a carbon vapor deposition (CVD) or resin infiltration process to make a carbon-carbon composite friction material. After optional heat treating in a furnace, the preforms are then machined to produce brake rotors.

Unfortunately, manufacturing woven and non-woven material from fiber is relatively expensive and, hence, preforms made from woven and non-woven material can be expensive. Also, woven fabric material tends to block the diffusion of gases, thereby making the uniform addition of the carbon matrix to the preforms more difficult and causing the preforms to have carbon matrices that are not uniform throughout the preforms. As a consequence, woven fabric material has an additional disadvantage in the manufacture of the preforms. In addition, an inventory of woven and non-woven segments or cloth must be maintained, with the woven and non-woven materials being separately handled and loaded into the needling machine. Such inventorying and handling are time-consuming and increase production costs. Therefore, there is a need in the industry for preforms made from less expensive material and for apparatuses and methods for manufacturing such preforms that do not require the inventorying and handling of woven and non-woven materials, that permit the uniform addition of a carbon matrix to the preforms, and that resolve these and other problems, difficulties, and shortcomings associated with the manufacture of carbonized brake rotor preforms.

SUMMARY OF THE INVENTION

Broadly described, the present invention comprises a continuous fiber brake rotor preform and apparatuses and methods for manufacturing the preform. According to an example embodiment, the continuous fiber brake rotor preform comprises a plurality of continuous fiber streams or filaments forming a substantially helical structure having layers or flights that are compressed together in the longitudinal direction of the structure. Each continuous fiber stream or filament may comprise the same type of fiber as that of other continuous fiber streams or filaments, or may comprise one or more types of fibers that are different from those of other continuous fiber streams or filaments. Each continuous fiber stream or filament extends substantially from a first end of the helical structure to a second end disposed longitudinally opposite the first end. Generally, each continuous fiber stream or filament resides laterally adjacent to another continuous fiber stream or filament within each layer or flight of the helical structure and adjacent to one or more other continuous fiber streams or filaments of longitudinally adjacent layers or flights. The continuous fiber streams or filaments are arranged such that the radial distance between each continuous fiber stream or filament and the structure's longitudinal axis varies with angular location about the longitudinal axis within a layer or flight of the helical structure. The radial distance also varies for each continuous fiber stream or filament at each angular location about the structure's longitudinal axis from layer-to-layer or flight-to-flight such that the same continuous fiber stream or filament does not substantially overlay itself from layer-to-layer or flight-to-flight.

The continuous fiber brake rotor preform further comprises web or z-direction fiber interspersed and mixed within the helical structure. Certain of the web or z-direction fibers and certain of the continuous fiber streams or filaments extend at least partially in the longitudinal direction between layers or flights of the helical structure. According to an example embodiment, the continuous fiber streams or filaments comprise tow fiber and the web fiber comprises loose or cut staple fiber.

The apparatuses for manufacturing the continuous fiber brake rotor preform comprise, in accordance with an example embodiment, an apparatus configured with a spreader to receive a continuous fiber input stream and to divide, or spread, the continuous fiber input stream into multiple continuous fiber output streams or filaments. The apparatus is also configured with a rotating and elevationally-positionable bowl having an annular-shaped cavity for receiving and layering the continuous fiber output streams or filaments to produce a helical structure having layers or flights and in which a large portion of the continuous fiber output streams or filaments extend from a first end of the helical structure to a longitudinally opposed second end of the helical structure. The spreader is adapted to move in a radial direction relative to the bowl's central longitudinal axis during rotation of the bowl such that the radial distance of each continuous fiber output stream or filament relative to the longitudinal axis generally varies at each angular location about the longitudinal axis and varies from layer-to-layer or flight-to-flight.

According to an example embodiment, the apparatus further comprises a delivery head for delivering web fiber to the bowl. The delivery head is configured to translate in a radial direction relative to the bowl's longitudinal axis in order to spread the web fiber across the continuous fiber output streams or filaments already present within the bowl. A radially-extending roller located between the spreader and delivery head is operative to act in concert with vertical positioning of the bowl and compresses the continuous fiber output streams or filaments and web fiber of the preform as the continuous fiber brake rotor preform is built up within the bowl. In addition, the apparatus comprises a needling head adapted for movement in a direction substantially perpendicular to the first and second longitudinal ends of the preform being formed and for needling the preform to pull fibers of the continuous fiber output streams and web fiber generally in the longitudinal direction and between layers or flights of the preform. A linear vertical displacement transducer and associated circuitry are adapted to control the elevation of the bowl (and, hence, of the preform) relative to the spreader, roller, delivery head, and needling head.

The methods for manufacturing the continuous fiber brake rotor preform comprise, according to an example embodiment, forming a helical structure of continuous fiber generally extending between longitudinally disposed ends thereof and having a plurality of layers or flights therebetween. The methods include, without limitation, steps of receiving a continuous fiber input stream, splitting the continuous fiber input stream into multiple continuous fiber output streams, and arranging the continuous fiber output streams in such layers or flights. The step of arranging includes varying the radial distance of each continuous fiber output stream relative to the central longitudinal axis of the preform within each layer or flight and between longitudinally adjacent layers or flights at angular locations about the longitudinal axis. The methods further include steps of adding web fiber between the layers or flights of the preform and needling the continuous fiber output streams and web fiber to better link the layers or flights together with fibers of the continuous fiber output streams and web fiber pulled between the layers or flights substantially in the direction of the preform's longitudinal axis.

Advantageously, the continuous fiber brake rotor preform has more uniform and improved mechanical and structural properties than other preforms due, at least in part, to the continuous fiber output streams or filaments extending substantially between the preform's longitudinal first and second ends. The more uniform and improved mechanical and structural properties are also due, at least in part, to the varying radial distances of each continuous fiber output stream or filament relative to the preform's longitudinal axis within layers or flights and between longitudinally adjacent layers or flights. Also advantageously, the use of continuous fiber or filaments eliminates the need to inventory and handle of woven and non-woven annular segments and eliminates difficulties in carbonization attributable to woven materials.

Other uses, advantages and benefits of the present invention may become apparent upon reading and understanding the present specification when taken in conjunction with the appended drawings.

BRIEF DESCRIPTION OF THE DRAWINGS

FIG. 4 displays a schematic, top plan view of tow fiber of a first layer of a continuous fiber brake rotor preform manufactured in accordance with the example embodiment of the present invention.

FIG. 5 displays a schematic, top plan view of tow fiber of a second layer of a continuous fiber brake rotor preform manufactured in accordance with the example embodiment of the present invention that is vertically adjacent to the first layer of FIG. 4.

FIG. 6 displays a schematic, top plan view of the tow fibers of the first and second vertically adjacent layers of a continuous fiber brake rotor preform manufactured in accordance with the example embodiment of the present invention, illustrating the radial offset of the tow fibers of vertically adjacent layers.

DETAILED DESCRIPTION OF EMBODIMENTS

Figure 1:
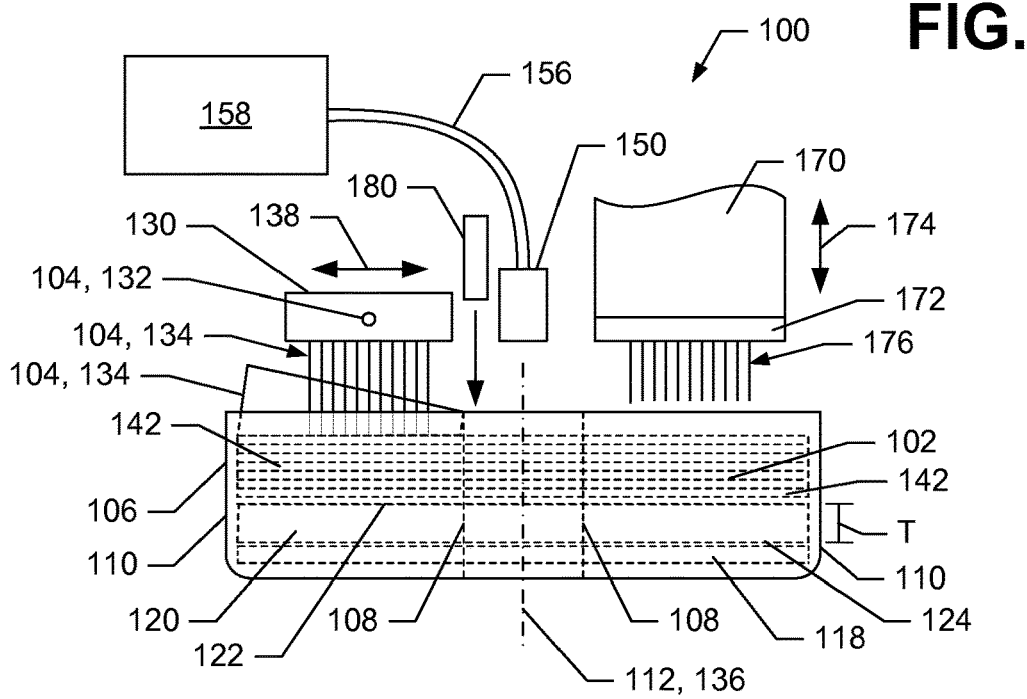
FIG. 1 displays a schematic, side view of certain components of a needling machine, in accordance with an example embodiment of the present invention, for manufacturing a continuous fiber brake rotor preform.
Figure 2:
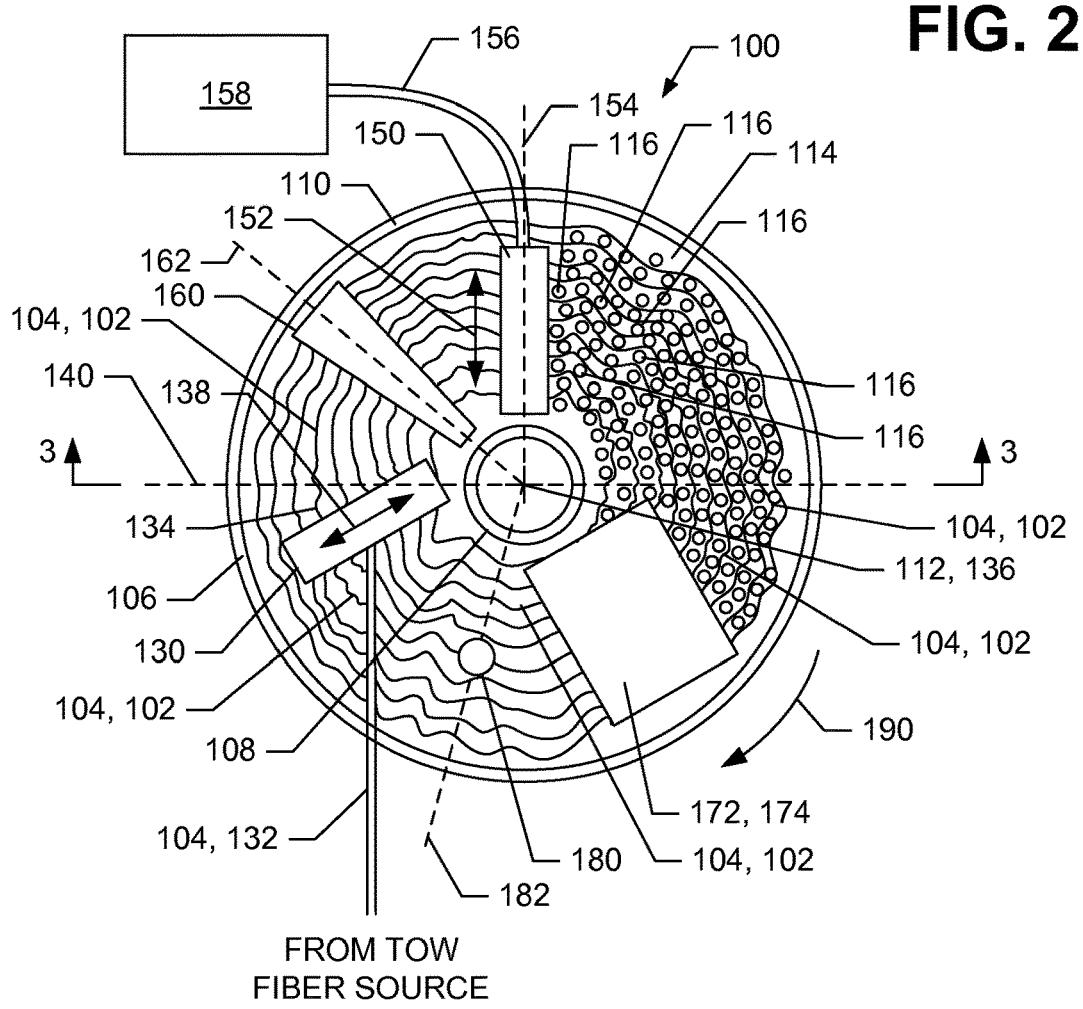
FIG. 2 displays a schematic, top plan view of the components of the needling machine of FIG. 1.

Referring now to the drawings in which like numerals represent like elements or steps throughout the several views, FIGS. 1 and 2 respectively display schematic, side and top plan views of certain components of an apparatus 100, in accordance with an example embodiment of the present invention, for manufacturing a continuous fiber brake rotor preform 102 (also sometimes referred to herein as a "preform 102") substantially comprising tow fiber 104. The apparatus 100 (also sometimes referred to herein as a "needling machine 100") includes a bowl 106 having a vertical inner wall 108 and vertical outer wall 110 that form a body of revolution about a central vertical axis 112. The bowl 106 defines an annular-shaped cavity 114 (see FIG. 2) extending between the inner and outer walls 108, 110 for the receipt of tow fibers 104 and, according to the example embodiment, staple fibers 116. The inner and outer walls 108, 110 are located at radii relative to the central vertical axis 112 that are appropriate for the dimensions of the particular preform 102 then being made so as to receive the tow fibers 104 of preform material therebetween and aid in forming the preform 102 as a continuous helix-like structure primarily of tow fibers 104. The bowl 106 also has a false bottom formed by a bottom plate 118 that is annularly-shaped and sized to translate vertically between the bowl's inner and outer walls 108, 110. A drive mechanism (not visible) is configured to raise and lower the bottom plate 118 during operation of the needling machine 100. The drive mechanism is also adapted to rotate the bowl 106 and bottom plate 118 about central vertical axis 112 at an appropriate rotational speed.

The needling machine 100 also comprises a foam base 120 that has an annular-shape and that is sized to extend substantially between the bowl's inner and outer walls 108, 110. The foam base 120 sits atop the bottom plate 118 and is raised and/or lowered in unison with the bottom plate 118. The foam base 120 has an upper surface 122 and an opposed lower surface 124, and defines a thickness, T, therebetween. The upper surface 122 supports the preform 102 and the lower surface 124 rests on and adjacent to the bottom plate 118. According to the example embodiment, the foam base 120 is manufactured from a foam material having a low density and/or a fast rebound rate such that when barbed needles 176 (described below) of the needling machine 100 penetrate and downwardly deflect portions of the upper surface 122 of the foam base 120 during needling of the preform 102, the deflection is minimized and any deflected portions of the foam base 120 rapidly return to their original non-deflected position and state. Such foam material may comprise a cross-linked polyethylene or similar semi-rigid material having a density in the range of 2.5 to 8.0 pounds per cubic foot, with densities between 3.0 and 3.5 pounds per cubic foot being most desirable. Also according to the example embodiment, the foam base 120 may have a thickness, T, measuring generally between 0.75 inch and 3.0 inches, with a thickness, T, of 1.0 inch being most common.

Additionally, the needling machine 100 comprises a spreader 130 for receiving a continuous input stream 132 of tow fiber 104 from a tow fiber source (not visible, but perhaps comprising a roll or drum about which tow fiber 104 has been previously wound) and spreading the input stream 132 into multiple output streams 134 of tow fiber 104, with each output stream 134 comprising one or more filaments of tow fiber 104. The spreader 130 directs the output streams 134 of tow fiber 104 into the bowl 106 substantially parallel to one another and at respective distances from the bowl's central vertical axis 112. Since the bowl's central vertical axis 112 is collinear with the central vertical axis 136 of the preform 102, the tow fibers 104 of the preform 102 are also substantially parallel to one another and located at respective distances from the preform's central vertical axis 136 as the output streams 134 of tow fibers 104 exit the spreader 130.

According to the example embodiment and as indicated by arrow 138, the spreader 130 translates back and forth in cooperative timing with rotation of the bowl 106 in order to vary the respective distance of each output stream 134 of tow fiber 104 from the bowl's central vertical axis 112 as the bowl 106 rotates. By varying the respective distance of each output stream 134 in this manner, the respective tow fibers 104 of the preform 102 are located at different distances from the preform's vertical central axis 136 at different angular positions about the preform's central vertical axis 136. Also according to the example embodiment, the spreader 130 translates back and forth as indicated by arrow 138 such that the tow fibers 104 corresponding to a particular output stream 134 of each vertically adjacent layer 142 (or "flight 142") of the preform's helix-like structure are generally offset at different radial distances from the preform's central vertical axis 136, or "out of phase", at each angular location about the preform's central vertical axis 136.

The needling machine 100 also comprises a delivery head 150 that, as indicated by arrow 152, translates back and forth between the bowl's inner and outer walls 108, 110 along a radius 154 of the bowl 106. The delivery head 150 receives loose staple fiber 116 via a conduit 156 extending between the delivery head 150 and a staple fiber source 158. According to the example embodiment, the staple fiber source 158 may comprise a device for chopping staple fiber 116 into a desirable size and for blowing the staple fiber 116 through conduit 156 to the delivery head 150. As the bowl 106 rotates, the staple fiber 116 falls from the delivery head 150 onto the preform 102 being manufactured at random locations and as distributed by the translation of the delivery head 150. The chopped, loose staple fiber 116 acts as web, or z-direction, fiber of the preform 102.

Additionally, the needling machine 100 comprises a roller 160 mounted between the bowl's inner and outer walls 108, 110 along a radius 162 extending from the bowl's central vertical axis 112. According to the example embodiment, the roller 160 is located arcuately between the spreader 130 and delivery head 150. During operation of the needling machine 100, the roller 160 rotates about a shaft (not visible) and in contact with the upper surface of the preform 102 being manufactured. The roller 160, according to the example embodiment, has a conical cross-sectional shape when cut by a horizontal plane and has a smaller diameter nearest the bowl's inner wall 108 and a larger diameter nearest the bowl's outer wall 110. The roller 160 exerts a generally downward force on the preform 102 tending to press, or compress, the tow fiber 104 of the vertically adjacent layers 142 of the preform 102 together in the vertical direction. Operation of the roller 160 also tends to push the staple fiber 116 generally downward into the vertically adjacent layers 142 of the preform so as to aid in linking the vertically adjacent layers 142 together in the preform's vertical direction.

In addition, the needling machine 100 comprises a needling head 170 and a needling board 172 mounted to and vertically beneath the needling head 170. The needling head 170 is driven by a drive mechanism (not visible) that causes the needling head 170 and, hence, the needling board 172 to travel rapidly and repeatedly in vertically up and down directions as indicated by double-headed arrow 174. The needling board 172 has a plurality of barbed needles 176 securely mounted therein such that when the needling board 172 translates up and down, the barbed needles 176 move up and down through a fixed distance. During operation of the needling machine 100 and needling of the tow fiber 104 and staple fiber 116 to form the preform 102, the barbed needles 176 pull fibers of the preform's uppermost vertically adjacent layers 142 downward into vertically adjacent layers 142 located beneath the uppermost layers 142 or into the foam base 120. By pulling fibers of the uppermost vertically adjacent layers 142 into vertically adjacent layers 142 beneath the uppermost vertically adjacent layers 142, the uppermost and lower vertically adjacent layers 142 become interconnected and form a substantially unitary preform structure.

Further, the needling machine 100 includes a vertical linear displacement transducer 180 (also sometimes referred to herein as "VLDT 180") that is fixedly secured to other structure of the needling machine 100 above the bowl's annular-shaped cavity 114 at a position along a radius 182 extending from the bowl's central vertical axis 112 and between the bowl's inner and outer walls 108, 110 (see FIG. 2). The vertical linear displacement transducer 180 is operative to continually measure the vertical distance between the top surface of the then uppermost layer 142 of the preform 102 and the vertical linear displacement transducer 180. Upon determining this vertical distance, the VLDT 180 produces an output signal that causes the bowl's drive mechanism to lower the bowl's bottom plate 118 sufficiently to maintain the top surface of the uppermost layer 142 of the preform 102 consistently at substantially the same vertical elevation.

During operation of the needling machine 100, the bowl 106 rotates clockwise about central vertical axis 112 as indicated by arrow 190 to form a preform 102 substantially from continuous tow fiber 104 rather than from pre-cut annular segments of woven and non-woven fiber. As the bowl 106 rotates, the needling machine 100 receives a continuous input stream 132 of tow fiber 104 from a tow fiber source that is fed into the spreader 130 where the input stream 132 is separated into multiple adjacent, continuous output streams 134 of tow fiber 104. The spreader 130 translates generally between the bowl's inner and outer walls 108, 110 while the bowl 106 rotates so that the output streams 134 of tow fiber 104 are laid initially atop the foam base 120 and, after one complete rotation of the bowl 106, atop the prior vertically adjacent layer 142 of the preform 102.

As each vertically adjacent layer 142 of tow fiber 104 is laid down, the bowl's bottom plate 118 is lowered to maintain the upper surface of the preform 102 at a substantially constant vertical elevation. The spreader's translation and rotation of the bowl 106 causes the output streams 134 of tow fiber 104 to be laid down at varying distances relative to the preform's central vertical axis 136 at different angular locations about the preform's central vertical axis 136. The spreader's translation and rotation of the bowl 106 also cause the tow fiber 104 corresponding to a particular output stream 134 to be laid down so that, in each vertically adjacent layer 142, or flight 142, of the preform 102, the tow fiber 104 is generally offset at different distances from the preform's central vertical axis 136 and is "out of phase", at each angular location about the preform's central vertical axis 136. By virtue of such tow fiber 104 being out of phase, the preform 102 has more consistent and uniform physical and mechanical properties throughout.

Once the tow fiber 104 is initially laid down, tow fiber 104 rotates in unison with the bowl 106 under roller 160. The tow fiber 104 is pushed in a generally downward vertical direction by the roller 160. The downward pressure of the roller 160 tends to compact the vertically adjacent layers 142, or flights 142, of the preform 102 and cause any previously added loose staple fiber 116 (as described below) to be pushed downward between layers 142 or flights 142 of the preform 102 and/or into a particular orientation such that the loose staple fiber 116 does not become re-oriented during subsequent operations on the preform 102.

Then, after further rotation of the bowl 106 under the delivery head 150, loose staple fiber 116 is delivered from the delivery head 150 onto the preform 102 being manufactured. The delivery head 150 translates substantially between the inner and outer walls 108, 110 of the bowl 106 while delivering loose staple fiber 116 to the preform 102 being manufactured. Such translation tends to more uniformly spread the staple fiber 116 in the radial direction of the preform 102. Some of the loose staple fiber 116 remains on the upper surface of the preform 102, while some of the loose staple fiber 116 falls downward into other layers 142 of the preform 102.

As the bowl 106 continues to rotate, the most recently laid down tow fiber 104 and staple fiber 116 pass under the needling board 172 where the tow fiber 104 and staple fiber 116 are engaged by the board's barbed needles 176 when the needling board 172 moves in a downward vertical direction relative to the preform 102. The engaged tow and staple fibers 104, 116 are pulled in a downward vertical direction toward the foam base 120 and into vertically adjacent layers 142, if any, beneath the most recently laid down tow and staple fibers 104, 116. Downward pulling of the engaged tow and staple fibers 104, 116 into such vertically adjacent layers 142, or flights 142, tends to vertically interconnect the vertically adjacent layers 142 of the preform 102 into a unitary structure and also tends to prevent the vertically adjacent layers 142, or flights 142, of the preform 102 from separating or delaminating.

After passing under the needling board 172, the most recently laid down tow and staple fibers 104, 116 and top surface of the preform 102 rotate under the VLDT 180. The VLDT 180 determines the elevation of the top surface and outputs a signal to the bowl's drive mechanism to lower the bowl's bottom plate 118 sufficiently to maintain the top surface of the preform 102 consistently at the same vertical elevation during manufacture of the entire preform 102. Through further rotation of the bowl 106, the most recently laid down tow and staple fibers 104, 116 rotate under the spreader 130 where new tow fiber 104 is laid down on the preform 102. Operation of the needling machine 100 continues according to the method described above until the entire preform 102 is manufactured. After removal of the preform 102 from the bowl 106, the preform 102 may be die cut to true up the inner and outer radial dimensions of the preform 102 in accordance with the specifications for the preform 102.

Figure 3:
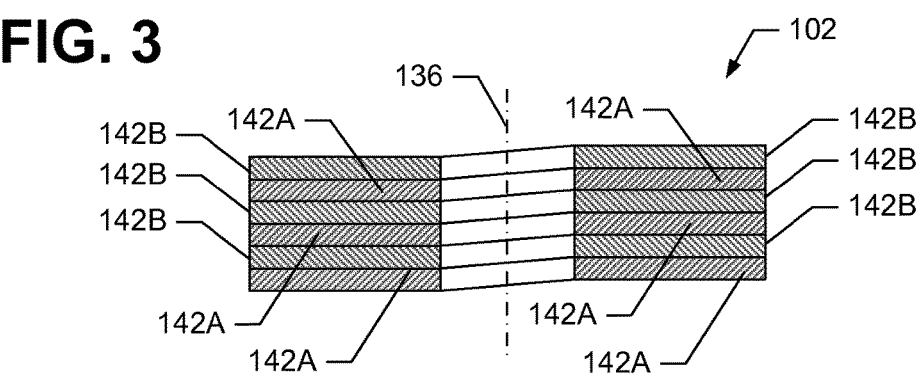
FIG. 3 displays a schematic, cross-sectional view of a portion of a continuous fiber brake rotor preform manufactured in accordance with the example embodiment of the present invention, taken along line 3-3 of FIG. 2.
Figure 3:
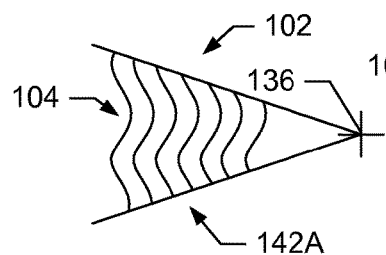
Figure 3:
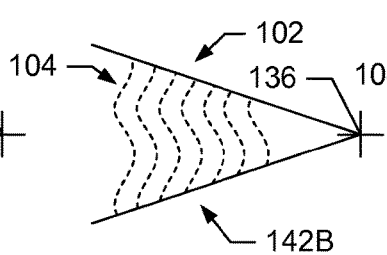
Figure 3:
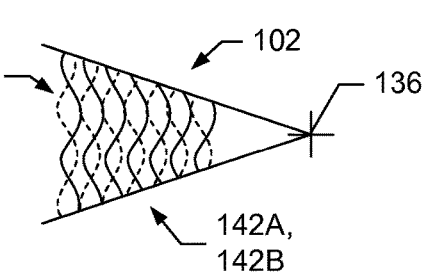

By virtue of the preform 102 being manufactured from a continuous stream of tow fiber 104, the preform 102 has a substantially helical structure having vertically adjacent layers 142 or flights 142 similar to the threads of a screw. FIG. 3 displays a cross-sectional view of a portion of a continuous fiber brake preform 102 manufactured using the needling machine 100 and methods described herein. In FIG. 3, the vertically adjacent layers 142, or flights 142, of the helical structure of the preform 102 are visible. Also, as indicated by the cross-hatching, the tow fiber 104 of vertically adjacent layers 142 or flights 142 is offset at varying distances relative to the preform's central vertical axis 136 to provide greater strength and more consistent physical and mechanical properties throughout. Such offset is more clearly understood by viewing FIGS. 4-6.

FIG. 4 displays a schematic, top plan view of the tow fiber 104 of a first layer 142A of a sector of the preform 102 showing the tow fiber 104 offset at various distances relative to the preform's central vertical axis 136 as the tow fiber 104 extends about the central vertical axis 136. FIG. 5 displays a schematic, top plan view of the tow fiber 104 of a second layer 142B of the same sector of the preform 102 showing the tow fiber 104 offset at various distances relative to the preform's central vertical axis 136 as the tow fiber 104 extends about the central vertical axis 136. The effect of the offsetting from layer-to-layer (or flight-to-flight) is seen in FIG. 6 where the top plan view of the tow fiber 104 of the first layer 142A of a sector of the preform 102 from FIG. 4 is superimposed on the top plan view of the tow fiber 104 of the second layer 142B of the same sector of the preform 102 from FIG. 5. As seen in FIG. 6, the tow fiber 104 of each vertically adjacent layer 142A, 142B is variously radially offset relative to the preform's central vertical axis 136 with the tow fiber 104 of each adjacent layer 142A, 142B being also variously offset relative to the tow fiber 104 of the other. Thus, through appropriate translation of the spreader 130 during manufacture of the preform 102, the tow fibers 104 of vertically adjacent layers 142A, 142B are not vertically aligned, thereby improving the physical and mechanical properties of the preform 102.

In an alternate embodiment of the present invention, the staple fiber 116 may be conveyed to the delivery head 150 rather than being blown and supplied to the delivery head 150 by conduit 156. In another alternate embodiment of the present invention, the staple fiber 116 may be replaced by web fiber from a roll of web fiber that is unrolled in the radial direction. In still another alternate embodiment of the present invention, the roller 160 may be positioned at a location between the delivery head 150 and needling board 172 so that the most recently laid down tow fiber 104 is pressed in a generally downward vertical direction after staple fiber 116 is added thereto. In yet another alternate embodiment of the present invention, multiple spreaders 130 may be utilized to refine the offset of each stream of tow fiber 104.

It should be understood and appreciated that the apparatuses and methods of manufacturing a preform described herein produce a preform where the fiber angles near the preform's inside radius are different than the fiber angles near the preform's outside radius. It should be further understood and appreciated that in yet another alternate embodiment using multiple spreaders fed with separate tows of fiber with different feed rates, the difference between the fiber angles near the preform's inside radius and the preform's outside radius is reduced.

Whereas the present invention has been described in detail above with respect to an example and alternate embodiments thereof, it should be appreciated that variations and modifications might be effected within the spirit and scope of the present invention.

What is claimed is:

1. A continuous fiber brake rotor preform, comprising:
   a plurality of continuous fiber filaments arranged in a helical structure having a central longitudinal axis, wherein said fiber filaments of said plurality of continuous fiber filaments have not been woven or preformed prior to being arranged in said helical structure and are not woven during or after arrangement in said helical structure, and wherein the number of continuous fiber filaments per unit area is substantially constant at each radial location throughout a plane of said helical structure perpendicular to said central longitudinal axis; and
   web fiber interspersed with said plurality of continuous fiber filaments.

2. The continuous fiber brake rotor preform of claim 1, wherein said helical structure has a first end and a second end disposed longitudinally opposite said first end, and wherein said continuous fiber filaments extend substantially between said first end and said second end.

3. The continuous fiber brake rotor preform of claim 1, wherein said plurality of continuous fiber filaments are arranged in a plurality of flights of continuous fiber filaments, wherein each continuous fiber filament defines a radial distance between said continuous fiber filament and said central longitudinal axis at each angular location about said central longitudinal axis, and wherein said radial distance for each continuous fiber filament varies within each flight of said plurality of flights.

4. The continuous fiber brake rotor preform of claim 1, wherein said plurality of continuous fiber filaments are arranged in a plurality of flights of continuous fiber filaments, wherein each continuous fiber filament defines a radial distance between said continuous fiber filament and said central longitudinal axis at each angular location about said central longitudinal axis, and wherein said radial distance for each continuous fiber filament varies at the same angular location within adjacent flights of said plurality of flights.

5. The continuous fiber brake rotor preform of claim 1, wherein at least one of said continuous fiber filaments of said plurality of continuous fiber filaments comprises tow fiber.

6. The continuous fiber brake rotor preform of claim 1, wherein a first continuous fiber filament of said plurality of continuous fiber filaments comprises a first material, and wherein a second continuous fiber filament of said plurality of continuous fiber filaments comprises a second material different from said first material.

7. The continuous fiber brake rotor preform of claim 1, wherein said web fiber comprises loose staple fiber.

8. The continuous fiber brake rotor preform of claim 1, wherein said web fiber comprises cut staple fiber.

9. The continuous fiber brake rotor preform of claim 1, wherein said plurality of continuous fiber filaments are arranged in a plurality of flights of continuous fiber filaments, and wherein certain continuous fiber filaments of the plurality of continuous fiber filaments extend between longitudinally adjacent flights of said plurality of flights of continuous fiber filaments.

10. The continuous fiber brake rotor preform of claim 1, wherein said plurality of continuous fiber filaments are arranged in a plurality of flights of continuous fiber filaments, and wherein certain fibers of said web fiber extend between longitudinally adjacent flights of said plurality of flights of continuous fiber filaments.

* * * * *